(12) United States Patent
Kuenzel

(10) Patent No.: US 9,784,221 B2
(45) Date of Patent: Oct. 10, 2017

(54) EXHAUST GAS FLOW CONTROL SYSTEM FOR AN INTERNAL COMBUSTION ENGINE

(71) Applicant: DAIMLER AG, Stuttgart (DE)

(72) Inventor: Stefan Kuenzel, Waiblingen (DE)

(73) Assignee: DAIMLER AG, Stuttgart (DE)

( * ) Notice: Subject to any disclaimer, the term of this patent is extended or adjusted under 35 U.S.C. 154(b) by 269 days.

(21) Appl. No.: 14/827,368

(22) Filed: Aug. 17, 2015

(65) Prior Publication Data

US 2015/0369181 A1    Dec. 24, 2015

Related U.S. Application Data

(63) Continuation-in-part of application No. PCT/EP2014/000346, filed on Feb. 7, 2014.

(30) Foreign Application Priority Data

Feb. 22, 2013    (DE) .......................... 10 2013 003 031

(51) Int. Cl.
*F02M 25/07*    (2006.01)
*F02B 37/02*    (2006.01)
(Continued)

(52) U.S. Cl.
CPC ....... *F02M 25/0773* (2013.01); *F02B 37/025* (2013.01); *F02B 37/183* (2013.01);
(Continued)

(58) Field of Classification Search
CPC .... F02M 25/0773; F02M 26/16; F02M 26/54; F02M 26/71; F02M 26/00;
(Continued)

(56) References Cited

U.S. PATENT DOCUMENTS 3,270,724 A * 9/1966 Dolza ..................... F02B 37/00
                                                        123/198 F
3,633,358 A * 1/1972 Sfinteanu ................ F02B 37/16
                                                        60/606
(Continued)

FOREIGN PATENT DOCUMENTS

DE    10 2005 021 172 A1    11/2006
DE    10 2006 022 181        11/2007
(Continued)

*Primary Examiner* — Thomas Moulis
*Assistant Examiner* — John Bailey
(74) *Attorney, Agent, or Firm* — Klaus J. Bach

(57) ABSTRACT

In an exhaust gas flow control system for an internal combustion engine, with a first exhaust gas duct and a second exhaust gas duct, through both of which exhaust gas from the internal combustion engine can flow to a turbine of an exhaust gas turbocharger with an exhaust gas recirculation line branching off the first exhaust gas duct, a shut-off element is provided which is adjustable between a closed position in which exhaust gas is prevented from flowing into the exhaust gas recirculation line and directing it via a communication passage into the second exhaust gas duct, and at least a first open position in which exhaust gas is directed out of the first exhaust gas duct into the exhaust gas recirculation line while blocking the communication passage between the first and second exhaust gas ducts and a second open position wherein both the first and the second exhaust gas ducts as well as the communication passage between the two ducts is open but the recirculation line is closed.

5 Claims, 1 Drawing Sheet

(51) Int. Cl.
- *F02D 9/06* (2006.01)
- *F02B 37/18* (2006.01)
- *F02B 37/22* (2006.01)
- *F02M 26/16* (2016.01)
- *F02M 26/54* (2016.01)
- *F02M 26/71* (2016.01)

(52) U.S. Cl.
CPC ............... *F02B 37/22* (2013.01); *F02D 9/06* (2013.01); *F02M 26/16* (2016.02); *F02M 26/54* (2016.02); *F02M 26/71* (2016.02); *Y02T 10/144* (2013.01)

(58) Field of Classification Search
CPC .... F02M 2026/01; F02M 26/02; F02M 26/03; F02M 26/04; F02M 26/05; F02M 26/06; F02M 26/07; F02M 26/08; F02M 26/09; F02M 25/07; F02B 37/025; F02B 37/183; F02B 37/22; F02D 9/06; Y02T 10/144
USPC ...... 123/353, 568.21, 568.23, 568.24, 568.2, 123/568.32, 320, 323, 568.11, 703, 123/568.18; 60/605.1, 607, 602, 603, 60/606, 612, 597, 598, 599, 600, 601, 60/604, 605.2; 188/154; 251/124, 149.2, 251/149.5, 207, 208, 209, 304, 305, 251/315.06, 315.07
See application file for complete search history.

(56) References Cited

U.S. PATENT DOCUMENTS

| | | | | |
|---|---|---|---|---|
| 4,008,572 A * | 2/1977 | Woollenweber, Jr. | .... | F01D 9/02 415/205 |
| 4,020,809 A * | 5/1977 | Kern | .......... | F02D 9/04 123/568.24 |
| 4,060,984 A * | 12/1977 | Paddock | .......... | F01N 3/22 60/290 |
| 4,313,415 A * | 2/1982 | Shinzawa | .......... | F02D 9/1055 123/568.15 |
| 5,044,402 A * | 9/1991 | Haas | .......... | F16K 1/16 137/625.44 |
| 5,560,208 A * | 10/1996 | Halimi | .......... | F02B 37/025 60/600 |
| 6,216,737 B1 * | 4/2001 | Taylor | .......... | F16K 11/22 137/271 |
| 6,484,703 B1 * | 11/2002 | Bailey | .......... | F02B 37/16 123/568.15 |
| 6,672,061 B2 * | 1/2004 | Schmid | .......... | F02B 37/02 123/568.17 |
| 6,948,483 B2 * | 9/2005 | Veinotte | .......... | F02M 35/10222 123/568.18 |
| 7,617,678 B2 * | 11/2009 | Joergl | .......... | F02M 26/16 123/568.12 |
| 7,987,837 B2 * | 8/2011 | Lupescu | .......... | F01N 3/0835 123/568.2 |
| 8,122,873 B2 * | 2/2012 | Furukawa | .......... | F02M 26/26 123/568.12 |
| 8,127,796 B2 * | 3/2012 | Bonanno | .......... | F16K 11/0853 137/625.47 |
| 8,166,754 B2 * | 5/2012 | Frantzheld | .......... | F01N 13/10 415/205 |
| 8,196,403 B2 * | 6/2012 | Hittle | .......... | F02M 26/22 60/602 |
| 8,539,768 B2 * | 9/2013 | Hayman | .......... | F01N 13/10 123/568.11 |
| 8,584,709 B2 * | 11/2013 | Albert | .......... | F16K 11/0525 137/340 |
| 8,713,936 B2 * | 5/2014 | Joergl | .......... | F02M 26/16 123/568.12 |
| 9,051,871 B1 * | 6/2015 | Wu | .......... | F02D 41/0087 |
| 9,441,531 B2 * | 9/2016 | Roozenboom | .......... | F02B 33/44 |
| 9,464,602 B2 * | 10/2016 | Kuehnel | .......... | F01N 3/043 |
| 9,546,591 B2 * | 1/2017 | Ge | .......... | F02B 37/025 |
| 9,567,927 B2 * | 2/2017 | Maurice | .......... | F02M 26/26 |
| 9,593,646 B2 * | 3/2017 | Laufer | .......... | F01N 13/08 |
| 9,657,652 B2 * | 5/2017 | Hossfeld | .......... | F02D 9/1095 |
| 2002/0166547 A1 * | 11/2002 | Bailey | .......... | F02B 37/16 123/568.15 |
| 2007/0062188 A1 * | 3/2007 | Fry | .......... | F02B 37/013 60/599 |
| 2007/0068500 A1 * | 3/2007 | Joergl | .......... | F02M 26/06 123/568.24 |
| 2008/0000229 A1 * | 1/2008 | Kuspert | .......... | F02B 37/02 60/605.2 |
| 2009/0120087 A1 * | 5/2009 | Sumser | .......... | F01N 13/107 60/600 |
| 2009/0183509 A1 * | 7/2009 | Joergl | .......... | F02M 26/16 60/605.2 |
| 2010/0037856 A1 * | 2/2010 | Dickerson | .......... | F02B 37/02 123/323 |
| 2010/0126169 A1 * | 5/2010 | Hegner | .......... | F02B 37/004 60/602 |
| 2010/0146954 A1 * | 6/2010 | Sloss | .......... | F01N 3/2889 60/320 |
| 2010/0148107 A1 * | 6/2010 | Keller-Staub | .......... | F16K 51/02 251/306 |
| 2010/0313858 A1 * | 12/2010 | Springer | .......... | F01N 3/0807 123/568.11 |
| 2011/0000208 A1 * | 1/2011 | Robinson | .......... | F02B 37/001 60/602 |
| 2011/0126812 A1 * | 6/2011 | Miyashita | .......... | F01N 13/107 123/703 |
| 2011/0302917 A1 * | 12/2011 | Styles | .......... | F02B 37/025 60/602 |
| 2013/0125542 A1 * | 5/2013 | Hayakawa | .......... | F01N 3/103 60/602 |
| 2013/0167812 A1 * | 7/2013 | Kurihara | .......... | F02M 25/0793 123/568.11 |
| 2014/0109569 A1 * | 4/2014 | Tsujita | .......... | F02M 26/44 60/599 |
| 2014/0144134 A1 * | 5/2014 | McEwan | .......... | F02B 37/183 60/602 |
| 2015/0267649 A1 * | 9/2015 | Remes | .......... | F01N 3/20 60/605.2 |
| 2016/0169167 A1 * | 6/2016 | Kuenzel | .......... | F02D 41/0087 60/605.2 |

FOREIGN PATENT DOCUMENTS

| | | |
|---|---|---|
| DE | 10 2008 064 264 A1 | 12/2010 |
| EP | 2295769 | 3/2011 |
| JP | 2006-112313 A | 4/2006 |
| WO | 2009018887 | 2/2009 |

* cited by examiner

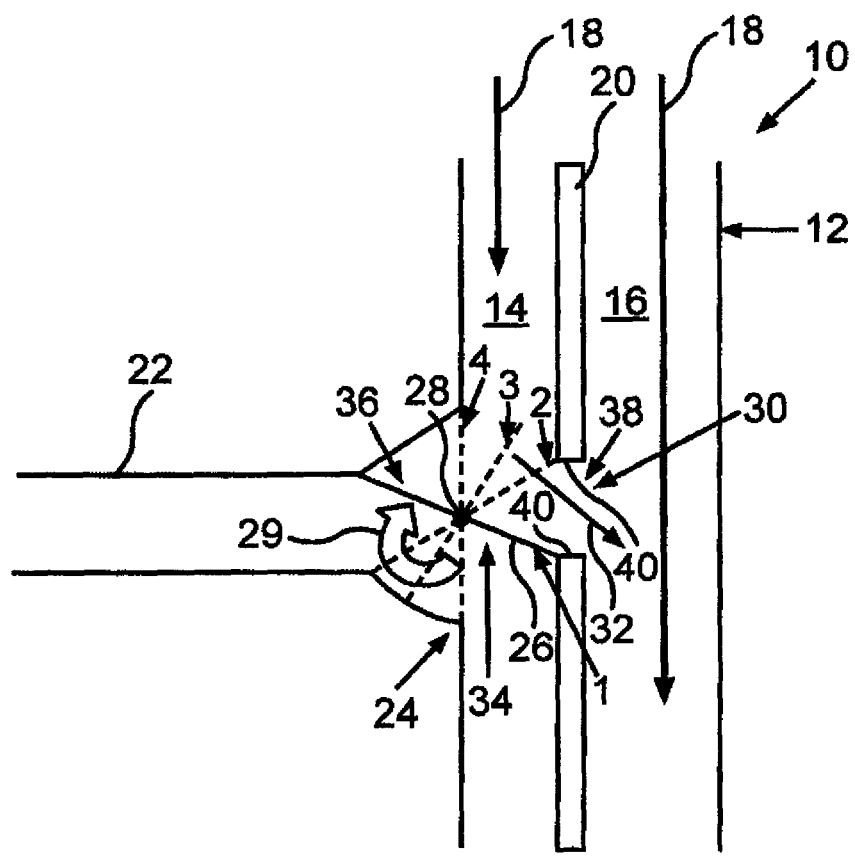

EXHAUST GAS FLOW CONTROL SYSTEM FOR AN INTERNAL COMBUSTION ENGINE

This is a Continuation-in-Part application of pending international patent application PCT/EP20141000346 filed 2014 Feb. 07 and claiming the priority of German patent application 10 2013 003031.5 filed 2013 Feb. 22.

BACKGROUND OF THE INVENTION

The invention relates to an exhaust gas system for an internal combustion engine.

Such an exhaust gas flow control system for an internal combustion engine, in particular of a motor vehicle, is known from DE 10 2008 064 264 A1. The exhaust gas system comprises a first exhaust gas duct as well as a second exhaust gas duct which is at least partially fluidically separated from the first exhaust gas duct. Exhaust gas from the internal combustion engine can flow through each of the exhaust gas ducts. Furthermore, the first exhaust gas duct is associated with a first turbine duct of a turbine of an exhaust gas turbocharger. The second exhaust gas duct is associated with a second turbine duct of the turbine which is at least partially fluidically separated from the first turbine duct. This means that exhaust gas is or can be delivered to the first turbine duct via the first exhaust gas duct, whilst exhaust gas from the internal combustion engine is or can be delivered to the second turbine duct via the second exhaust gas duct.

The exhaust gas flow control system further comprises an exhaust gas return line which branches off from the first exhaust gas duct. To this end, the exhaust gas return line is connected fluidically to the first exhaust gas duct at a branch point of the first exhaust gas duct, so that, at the branch point, exhaust gas from the first exhaust gas duct can be diverted into the exhaust gas return line. The exhaust gas return line serves for returning exhaust gas from the internal combustion engine to an inlet side of the latter, in order thus to be able to achieve low-emission operation of the internal combustion engine.

Finally, the exhaust gas flow control system comprises a shut-off element. The shut-off element is adjustable between at least one closed position, which prevents exhaust gas from flowing out of the first exhaust gas duct into the exhaust gas return line, and at least one open position, which allows exhaust gas to flow out of the first exhaust gas duct into the exhaust gas return line. In other words, in the at least one closed position the exhaust gas return line is fluidically shut off, so that exhaust gas does not flow through the exhaust gas return line. In the open position, the exhaust gas return line is fluidically opened, so that exhaust gas flows through the exhaust gas return line.

An exhaust gas system for an internal combustion engine is also known from DE 10 2005 021 172 A1. The exhaust gas from a defined number of cylinders of the internal combustion engine flows through a first exhaust gas duct. The exhaust gas from the remaining cylinders of the internal combustion engine flows through a second exhaust gas duct. A bypass line is provided between the first exhaust gas duct and the second exhaust gas duct. The exhaust gas ducts can be fluidically connected to one another by means of the bypass. A first shut-off element, by means of which the bypass line can be fluidically opened and shut off, is disposed in the bypass line. Furthermore, the exhaust gas system has an exhaust gas return line which branches off from the first exhaust gas duct and has a second shut-off element. The exhaust gas return line can be fluidically opened and shut off by the second shut-off element. Finally, the first exhaust gas duct has a third shut-off element downstream of the exhaust gas return line. The first exhaust gas duct can be fluidically opened and shut off by the third shut-off element. This exhaust gas system has a relatively high degree of complexity. Furthermore, in the conventional exhaust gas systems it has proved difficult and particularly costly to be able to achieve high engine braking performance of the internal combustion engine.

It is the object of the present invention to provide an exhaust gas flow control system of the type referred to above in such a way that, by means of the exhaust gas system, it is also possible to achieve high engine braking performance in a particularly uncomplicated manner.

SUMMARY OF THE INVENTION

In an exhaust gas flow control system for an internal combustion engine, with a first exhaust gas duct and a second exhaust gas duct, through both of which exhaust gas from the internal combustion engine can flow to a turbine of an exhaust gas turbocharger with an exhaust gas recirculation line branching off the first exhaust gas duct, a shut-off element is provided which is adjustable between a closed position in which exhaust gas is prevented from flowing into the exhaust gas recirculation line and directing it via a communication passage into the second exhaust gas duct, and at least a first open position in which exhaust gas is directed out of the first exhaust gas duct into the exhaust gas recirculation line while blocking the communication passage between the first and second exhaust gas ducts and a second open position wherein both the first and the second exhaust gas ducts as well as the communication passage between the two ducts is open but the recirculation line is closed.

The shut-off element is for example a valve element, in particular a flap, which is pivotable about a pivot axis between the closed position and the open position. The number of parts, the weight and the costs of the exhaust gas system can be kept particularly low by the use of the single shut-off element both for blocking the exhaust gas return line and also for blocking the connecting passage. Moreover a very high functional reliability of the exhaust gas system can be ensured.

In a particularly advantageous embodiment of the invention, the first exhaust gas duct is fluidically shut off by means of the shut-off element in the first closed position at least downstream of the connecting passage. This means that the exhaust gas can flow via the first exhaust gas duct as far as the connecting passage, but not any further through the first exhaust gas duct. And since in the closed position the exhaust gas return line is also blocked by the shut-off element, the exhaust gas cannot flow through the exhaust gas return line either. Thus the exhaust gas flows via the connecting passage from the first exhaust gas duct into the second exhaust gas duct, so that all of the exhaust gas downstream of the connecting passage flows through the second exhaust gas duct and accordingly is delivered to the second turbine duct, whereas no exhaust gas is delivered to the first turbine duct As a result, particularly high engine braking performance is achieved in an engine braking mode of the internal combustion engine. This high engine braking performance can occur without the use of an additional shut-off element.

Furthermore, the exhaust gas system allows an asymmetry of the turbine ducts and/or the exhaust gas ducts to be kept as low as possible and, where appropriate, the turbine ducts and/or the exhaust gas ducts even to be configured symmetrically with respect to one another, whilst nevertheless achieving very high engine braking performance.

In another position of the shut-off element, the first exhaust gas duct is fluidically shut off by means of the shut-off element in the first closed position at least downstream of a branch point at which the exhaust gas from the first exhaust gas duct can be diverted into the exhaust gas return line. Advantageously, in the first open position the connecting opening is also fluidically shut off, so that a particularly high exhaust gas recirculation rate or the maximum possible exhaust gas recirculation rate of exhaust gas to the inlet side of the internal combustion engine is achieved, so that in particular nitrogen oxide emissions can largely be lowered in a fueled operation of the internal combustion engine.

The shut-off element can be adjusted into a second open position, in which in each case the exhaust gas return line and also the first exhaust gas duct as well as the connecting opening are fluidically opened. Advantageously, in the fueled mode of the internal combustion engine or in a main operating range of the internal combustion engine by means of the second open position, an exhaust gas recirculation rate and a supply to the turbine can be set, so that also minimum exhaust gas recirculation rates can be controlled, so that a particularly effective operation of the internal combustion engine with low exhaust as emissions is made possible.

The shut-off element can also be adjusted into a second closed position, in which exhaust gas from the first exhaust gas duct is prevented from flowing into the exhaust gas return line and the connecting opening between the exhaust gas ducts is opened. Advantageously, all of the exhaust gas of the internal combustion engine then flows in both exhaust gas ducts to the turbine of the exhaust gas turbocharger, so that an increased compression of the air for combustion by a compressor of the exhaust gas turbocharger is achieved on the inlet side of the internal combustion engine, so that in particular in the event of a load demand for the internal combustion engine or in the event of a sudden load variation an increased torque is very quickly available.

In a further embodiment of the invention, the second exhaust gas duct has a larger cross-section through which exhaust gas flows than the first exhaust gas duct. Advantageously, due to the smaller cross-section, the exhaust gas pressure in the first exhaust gas duct is increased, so that even at high charging levels exhaust gas can be recycled, whereby a particularly efficient reduction of the emissions, in particular the nitrogen oxide emissions can be achieved.

In an alternative embodiment of the invention, the cross-sections of the exhaust gas ducts are the same size. Advantageously, due to the exhaust gas duct according to the invention, by means of the shut-off element a reduction of the cross-section of the first exhaust gas duct can be set, so that a pressure increase in the first exhaust gas duct and the exhaust gas return line is possible, whereby a corresponding pressure differential to the engine inlet side is generated and an exhaust gas recirculation becomes more effective.

Further advantages, characteristics and details of the invention will become more readily apparent from the following description of a preferred exemplary embodiment with reference to the accompanying drawing.

BRIEF DESCRIPTION OF THE DRAWING

The drawing shows as, a detail in the single FIGURE a schematic sectional view of an exhaust gas flow control system for an internal combustion engine, in particular of a motor vehicle.

DESCRIPTION OF A PARTICULAR EMBODIMENT OF THE INVENTION

The drawing shows, in a schematic sectional view, an exhaust gas system 10 for an internal combustion engine (not shown). In this case, the internal combustion engine is a reciprocating internal combustion engine and comprises a plurality of cylinders. Furthermore, the internal combustion engine comprises an inlet side for delivering air for combustion to the cylinders and an outlet side for discharging exhaust gases from the cylinders. By means of the exhaust gas flow control system 10, the exhaust gas can be directed from the engine outlet side to a turbine of an exhaust gas turbocharger and/or into an exhaust gas recirculation system. Exhaust gas can flow to the inlet side via the exhaust gas recirculation system. A compressor of the exhaust gas turbocharger compresses combustion air for supply to the engine inlet side.

The exhaust gas flow control system 10 comprises an exhaust gas pipe 12 with a first exhaust gas duct 14 and with a second exhaust gas duct 16. As is indicated in the drawing by directional arrows 18, the exhaust gas from the internal combustion engine can flow through the two exhaust gas ducts 14, 16. The exhaust gas ducts 14, 16 are separated fluidically from one another by means of at least one intermediate wall 20 of the exhaust gas pipe 12. By a corresponding fluidic coupling of the exhaust gas ducts 14, 16 to the outlet side, a first defined number of cylinders and thus the exhaust gas from these cylinders can be associated with the first exhaust gas duct 14, whilst a second remaining number of cylinders and thus exhaust gas from these cylinders are associated with the second exhaust gas duct 16, The exhaust gas flow control system 10 also comprises an exhaust gas return line 22 of the exhaust gas recirculation system, which branches off from the first exhaust gas duct 14 at a branch point 24 of the first exhaust gas duct 14 and extends to the engine inlet side. By means of the exhaust gas return line 22, exhaust gas flowing through the first exhaust gas duct 14 can be diverted at the branch point 24, so that exhaust gas flowing through the first exhaust gas duct 14 is directed into the exhaust gas return line 22. The exhaust gas return line 22 serves for returning some of the exhaust gas to the inlet side of the internal combustion engine, via which the recycled exhaust gas is again delivered to at least some of the cylinders. As a result, the emissions and in particular the nitrogen oxide emissions from the internal combustion engine can be kept low, so that for example statutory exhaust emission standards can be met.

At least the turbine (not shown in the drawing) of the exhaust gas turbocharger is disposed downstream of the branch point 24 in the flow direction 18 of the exhaust gas through the exhaust gas pipe 12. The turbine comprises a turbine housing in which a turbine wheel is accommodated so as to be rotatable about an axis of rotation relative to the turbine housing. The turbine housing comprises two turbine inlet ducts which are at least partially fluidically separated from one another and by means of which the exhaust gas can be delivered to the turbine wheel. The exhaust gas is directed onto the turbine wheel to thereby drive the turbine.

As is generally well known, the turbine inlet ducts are for example in each case designed as spiral channels which extend at least substantially spirally in the circumferential direction of the turbine wheel over the circumference thereof. The turbine ducts are designed asymmetrically or symmetrically relative to one another with regard to their cross-sections.

The first exhaust gas duct 14 is associated with a first one of the turbine inlet ducts. This means that the exhaust gas duct 14 is fluidically coupled to the first turbine inlet duct. Thus the exhaust gas flowing through the first exhaust gas duct 14 downstream of the branch point 24 can be delivered to the first turbine duct.

The second exhaust gas duct 16 is associated with the second turbine duct. This means that the second exhaust gas dud 16 is fluidically coupled to the second turbine duct, so that the exhaust gas flowing through the second exhaust gas duct 16 can flow into the second turbine inlet duct.

The exhaust gas system 10 further comprises a shut-off element in the form of a flap 26 which is pivotable relative to the exhaust gas pipe 12 about a pivot axis 28 between a plurality of positions 1, 2, 3, 4. In this case, the first flap position 1 is illustrated by a solid line, whilst the positions 2, 3 and 4 are illustrated by of dashed lines. The pivotability of the flap 26 is illustrated in the drawing by a directional arrow 29.

The first flap position 1 is a closed position of the flap valve 26, in which exhaust gas is prevented from flowing out of the first exhaust gas duct 14 into the exhaust gas return line 22 by means of the valve flap 26. The exhaust gas return line 22 is fluidically shut off in the first closed position 1, so that exhaust gas cannot flow through it. Furthermore, a connecting passage 30 between the exhaust gas ducts 14, 16 is opened in the first closed flap position 1. A transfer of exhaust gas from the first exhaust gas duct 14 to the second exhaust gas duct 16 is provided for via the connecting passage 30. The passage 30 is in the form of a through opening 38 in the intermediate wall 20. The through-opening 38 is delimited by walls 40 of the intermediate wall 20.

Furthermore, the first exhaust gas duct 14 is fluidically shut off by means of the flap 26 in the first closed position 1 downstream of the connecting passage 30. This means that exhaust gas no longer flows through the first exhaust gas duct 14 downstream of the connecting passage 30. The exhaust gas flowing through the first exhaust gas duct 14 upstream of the connecting passage 30 thus flows, in the first closed position 1, through the opened connecting passage 30 into the second exhaust gas duct 16, so that all of the exhaust gas from all cylinders flows through the second exhaust gas duct 16 downstream of the connecting passage 30. This redirection of the exhaust gas out of the first exhaust gas duct 14 into the second exhaust gas duct 16 is illustrated in the drawing by a directional arrow 32. Since in the first closed position 1 of the flap 26, the exhaust gas return line 22 and the first exhaust gas duct 14 are closed and the connecting passage 30 from the first exhaust gas duct 14 to the second exhaust gas duct 16 is opened, strong charging of the internal combustion engine with combustion air by the exhaust gas turbocharger takes place, which is accompanied by a high backpressure in the exhaust ducts 14 to 16 resulting in a high engine braking performance during engine braking. In the engine braking mode, no fuel is injected into the cylinder, so that the internal combustion engine is operated as a compressor. Internal combustion engines, which are operated in an engine braking mode, usually have devices which are known per se for increasing the engine braking performance. This may for example be a decompression brake which is known per se. By bringing together the exhaust gas from all cylinders into the second exhaust gas duct 16, a particularly effective charging of the internal combustion engine in the engine braking mode can be achieved by an optimal incident flow onto the turbine.

In addition, the number of parts of the exhaust gas flow control system 10 can be kept particularly low, since the one flap 26 is used both for fluidically shutting off the first exhaust gas duct 14 downstream of the connecting passage 30 and for fluidically shutting off the exhaust gas return line 22. In this connection the flap 26 in its first closed position 1 protrudes with a first part-region 34 into the first exhaust gas duct 14 and with an adjoining second part-region 36 into the exhaust gas return line 22. In this case, the first part-region 34 serves for fluidically shutting off the first exhaust gas duct 14 downstream of the connecting passage 30, whilst the second part-region 36 is used for fluidically shutting off the exhaust gas return line 22. The two part-regions 34, 36 of the flap 26 pivot in each case about the pivot axis 28.

The position 2 is a first open position of the valve flap 26, in which the exhaust gas return line 22 is fluidically opened. In the first open position 2, the connecting passage 30 is fluidically shut off, so that exhaust gas cannot flow through it. Furthermore, in the second open position 14, the first exhaust gas duct 14 is fluidically shut off downstream of the branch point 24, so that then exhaust gas cannot flow through it. This means that all of the exhaust gas flowing through the first exhaust gas duct 14 upstream of the branch point 24 is diverted out of the first exhaust gas duct 14 and delivered to the exhaust gas return line 22. In this way, a maximally adjustable exhaust gas recirculation rate (EGR rate) is set.

The position 3 is a second open position or intermediate position of the flap 26, which is adjusted in a main operating range of the internal combustion engine. In the second open position 3, both the exhaust gas return line 22 and the first exhaust gas duct 14 as well as the connecting passage 30 are opened and consequently exhaust gas can flow through them. By a variation of the intermediate position of the second open position 3, the exhaust gas from the internal combustion engine can be distributed correspondingly into the exhaust gas return line 22, the first exhaust gas duct 14 and through the connecting passage 30.

The position 4 of the flap 26 is a second closed position in which the exhaust gas return line 22 is fluidically shut off and the connecting passage 30 is opened. In the second closed position 4, the first exhaust gas duct 14 is fully opened. This means that in the second closed position, the exhaust gas can flow in each case through both exhaust gas ducts 14, 16. In this way for example an improved sudden load variation in the fueled mode of the internal combustion engine is feasible, as in the event of a corresponding load requirement all of the exhaust gas can act exclusively via the two exhaust gas ducts 14, 16 on the turbine of the exhaust gas turbocharger, so that a correspondingly increased charging pressure can be implemented by means of the compressor of the exhaust gas turbocharger, whereby an enlarged amount of combustion air is provided and the internal combustion engine can generate a higher torque correspondingly quickly.

As can be seen from the drawing, the exhaust gas ducts 14, 16 are configured asymmetrically: The first exhaust gas duct 14 has a smaller flow cross-section through which exhaust gas can flow than the second exhaust gas duct 16. Since the exhaust gas return line 22 branches off from the first exhaust gas duct 14, the first exhaust gas duct 14 is also referred to as an EGR duct (exhaust gas return duct). Thus the first exhaust gas duct 14 serves in particular for providing exhaust gas with a high pressure for the exhaust gas recirculation system. The cross-section of the first exhaust gas duct 14 is designed in particular for a pressure of the exhaust gas which exceeds a pressure of the combustion air at the engine inlet side. The pressure of the air for combustion on the inlet side of the internal combustion engine is raised by the compressor of the exhaust gas turbocharger. For exhaust gas recirculation the pressure of the exhaust gas flowing into the exhaust gas return line 22 from the first exhaust gas duct 14 needs to exceed the pressure of the combustion air supply.

By means of the exhaust gas flow control system 10 according to the invention it is also conceivable to configure the two exhaust gas ducts 14, 16 symmetrically with regard to their respective cross-sections. By a corresponding variation in particular of the second open position 3, the cross-section of the first exhaust gas duct 14 can be reduced so far that a pressure of the exhaust gas in the first exhaust gas duct 14 and in particular in the exhaust gas return line 22 exceeds a pressure on the inlet side. Advantageously, the greater cross-section of the first exhaust gas duct 14 provided due to the symmetry reduces the pressure of the exhaust gas in the first exhaust gas duct, so that, when the gas duct 14 is open that is the valve flap 26 is in the No. 4 position, the internal combustion engine with the cylinders associated with the first exhaust gas duct 14 has to apply less power for discharging the exhaust gas from the cylinders into the outlet side, so that the efficiency of the internal combustion engine increases and at the same time consumption and exhaust gas emissions are reduced.

As can be seen from the drawing, the valve flap 26 is associated with both the exhaust gas return line 22 and the first exhaust gas duct 14 as well as the connecting passage 30 and serves for fluidically shutting off and opening this passage. Thus the number of parts and the complexity of the exhaust gas system 10 can be kept particularly low.

Since the flap 26 has a very large adjustment range, the engine braking performance and the exhaust gas recirculation can be very easily controlled and in particular regulated.

In order to achieve a low-emission operation with the internal combustion engine with high engine braking performance, the same number of cylinders can be associated in each case with the exhaust as ducts 14 and 16. Of course an irregular distribution of the cylinders to the exhaust gas ducts 14 and 16 is also conceivable.

Furthermore, in order to keep flow losses in the exhaust gas system 10 particularly low, it may be advantageously provided that in the main operating range, the flap 26 extends at least substantially parallel to the flow direction of the exhaust gas through the exhaust gas pipe 12 or through the first exhaust gas duct 14.

What is claimed is:

1. An exhaust gas flow control system (10) for an internal combustion engine, comprising:
   a first exhaust gas duct (14), which is associated with a first inlet duct (16) of a turbine of an exhaust gas turbocharger and through which exhaust gas from the internal combustion engine can flow,
   a second exhaust gas duct (16), which is at least partially fluidically separated from the first exhaust gas duct (14) and through which exhaust gas from the internal combustion engine can flow and which is associated with a second inlet duct of the turbine,
   an exhaust gas return line (22) which branches off from the first exhaust gas duct (14), and
   a shut-off valve (26) which is adjustable between at least one closed position (1), which prevents exhaust gas from flowing out of the first exhaust gas duct (14) into the exhaust gas return line (22), and a first open position (2), which allows exhaust gas to flow out of the first exhaust gas duct (14) into the exhaust gas return line (22),
   a fluidic connecting passage (30) provided between the exhaust gas ducts (14, 16), via which exhaust gas can be diverted out of the first exhaust gas duct (14) and can be delivered to the second exhaust gas duct (16) when the shut-off valve (26) is in the first closed position (1) and the shut-off element (26) in the first open position (2) blocking the first exhaust gas duct (14) at least downstream of the fluidic connection (30) and opening the gas exhaust gas return line (22),
   the shut-off element (26) being movable to a second closed position (4), in which the return line (22) is blocked so that the exhaust gas from the first exhaust gas duct (14) is prevented from flowing into the exhaust gas return line (22) and the connecting passage (30) between the exhaust gas ducts (14, 16) and the first exhaust gas duct (14) is opened so as to divert exhaust gas from the first exhaust gas duct (14) into the second exhaust das duct (16).

2. The exhaust gas flow control system (10) according to claim 1, wherein the first exhaust gas duct (14) is fluidically shut off by the shut-off valve (26) in its first open position (2) downstream of a branch point (24) so that all the exhaust gas from the first exhaust gas duct (14) is diverted into the exhaust gas return line (22).

3. The exhaust gas flow control system (10) according to claim 1, wherein the shut-off valve (26) is adjustable into an intermediate open position (3), in which the exhaust gas return line (22) and also the first exhaust gas duct (14) as well as the connecting passage (30) are open.

4. The exhaust gas flow control system (10) according to claim 1, wherein second exhaust gas duct (16) has a larger cross-section through which exhaust gas flows than the first exhaust gas duct (14).

5. The exhaust gas flow control system (10) according to claim 1, wherein the cross-sections of the exhaust gas ducts (14, 16) are the same size.

* * * * *